(12) United States Patent
Kim

(10) Patent No.: US 9,821,677 B2
(45) Date of Patent: Nov. 21, 2017

(54) SYSTEM AND METHOD FOR CHARGING ELECTRIC VEHICLE

(71) Applicant: Hyundai Motor Company, Seoul (KR)

(72) Inventor: Dae Sik Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 224 days.

(21) Appl. No.: 14/933,121

(22) Filed: Nov. 5, 2015

(65) Prior Publication Data

US 2016/0264013 A1 Sep. 15, 2016

(30) Foreign Application Priority Data

Mar. 10, 2015 (KR) .......................... 10-2015-0033051

(51) Int. Cl.
*B60L 11/18* (2006.01)
*H02J 7/00* (2006.01)

(52) U.S. Cl.
CPC ....... *B60L 11/1848* (2013.01); *B60L 11/1824* (2013.01); *B60L 11/1861* (2013.01); *H02J 7/0047* (2013.01); *H02J 2007/005* (2013.01)

(58) Field of Classification Search
CPC .............. B60L 11/1848; B60L 11/1824; B60L 11/1861; H02J 7/0047; H02J 2007/005
USPC ....................................................... 320/109
See application file for complete search history.

(56) References Cited

U.S. PATENT DOCUMENTS

| 8,698,642 | B2* | 4/2014 | Taguchi | B60L 3/12 340/636.1 |
| 2011/0106329 | A1* | 5/2011 | Donnelly | B60L 3/12 700/291 |
| 2016/0129802 | A1* | 5/2016 | Yoon | B60L 11/1848 705/412 |

FOREIGN PATENT DOCUMENTS

| JP | 2010-154646 A | 7/2010 |
| JP | 2010-230615 A | 10/2010 |
| JP | 2010-268585 A | 11/2010 |
| JP | 2013-090359 A | 5/2013 |
| KR | 10-1262459 | 5/2013 |
| KR | 10-2014-0079593 A | 6/2014 |

* cited by examiner

*Primary Examiner* — M'Baye Diao
(74) *Attorney, Agent, or Firm* — Mintz Levin Cohn Ferris Glovsky and Popeo, P.C.; Peter F. Corless

(57) ABSTRACT

A system and method for charging an electric vehicle are provided. The system includes a head unit that receives information regarding a battery of a power module mounted within the electric vehicle and displays the information. The head unit also sets variable reserved charging of the battery or a destination of a battery charging station based on a charging amount obtained from the power module. Additionally, information regarding the power module or a residual quantity of the battery of the electric vehicle is acquired and the information regarding the electric vehicle is stored or a current location is acquired.

24 Claims, 3 Drawing Sheets

SYSTEM AND METHOD FOR CHARGING ELECTRIC VEHICLE

CROSS-REFERENCE TO RELATED APPLICATION(S)

This application claims the benefit of Korean Patent Application No. 10-2015-0033051, filed on Mar. 10, 2015, which is hereby incorporated by reference as if fully set forth herein.

BACKGROUND

Field of the Invention

The present invention relates to a system and method for charging an electric vehicle, and more particularly, to a system and method for charging an electric vehicle in which a reserved start/finish time for charging the electric vehicle is variably set and a charging time or a charging amount of the electric vehicle is automatically set by a head unit or a mobile terminal.

Discussion of the Related Art

A variety of research has been continuously conducted to reduce exhaust gas of a vehicle, and a vehicle capable of reducing exhaust gas has been developed in the industry. As a result of such research and development, commercialization of an electric vehicle that does not generate exhaust gas has been conducted. Currently, alternative energy has been developed to cope with depletion of fossil fuels such as petroleum and coal. In particular, an electric vehicle using electric energy has been actively developed.

An electric vehicle refers to a vehicle that operates using electricity as a power source, and a vehicle that includes a rechargeable battery as the power source and that operates using power supplied from the battery. The electric vehicle includes a driving motor driven by electricity to operate the vehicle and a battery that supplies electricity to the driving motor in addition to a basic functional part of a vehicle having the same components as those of a general vehicle.

In addition, a scheduler is provided to charge the battery within the electric vehicle. However, various charging methods in which a charging start time or a charging finish time is set have been commercialized, and the scheduler linearly performs charging by statically inputting a charging amount. Therefore, an optimum time slot, a rate, and a vehicle state are not considered with regard to a charging method of the electric vehicle, which causes driver inconvenience.

SUMMARY

The present invention provides a system for charging an electric vehicle to automatically set a variable charging time or charging amount based on an electricity rate and a vehicle state for each date and for each time slot with respect to a charging start time or a charging ending time of the electric vehicle and a route to a destination by a head unit mounted within the vehicle or a mobile terminal.

To achieve these objects and other advantages and in accordance with the purpose of the invention, a system for charging an electric vehicle may include a head unit configured to receive information regarding a battery of a power module disposed within the electric vehicle, and display the information, wherein the head unit may include a setting unit configured to set variable reserved charging of the battery or a destination of a battery charging station based on a charging amount obtained from the power module, a measurement unit configured to acquire information regarding the power module or a residual quantity of the battery of the electric vehicle, and a storage unit including map data to store information regarding the electric vehicle or acquire a current location or a destination.

The system may further include a telematics center configured to receive input of a charging amount for each time slot, information regarding air conditioning may be set and a vehicle state to perform reserved charging of the electric vehicle, and transmit the input to a mobile terminal. The telematics center may be configured to transmit, to the mobile terminal, a result of adjusting time in response to an optimum charging time set with respect to reserved charging of the power module or information regarding recharging time in response to power consumption of the power module.

The head unit may further include a rate computation unit configured to compute a charging rate of the electric vehicle based on a power transfer amount between the electric vehicle and the charging station and rate information for each time slot. The rate computation unit may further be configured to calculate an electric rate with respect to battery usage efficiency or an amount of used power of the electric vehicle, and display the electric rate on the head unit (e.g. on a display device).

The setting unit may be configured to set an operation for a set charging time or charging amount of the electric vehicle. Additionally, the setting unit may be configured to set charging information of the electric vehicle by inputting information regarding a vehicle state or a vehicle route or infrastructure information. The setting unit may further be configured to set an optimum charging time slot and charging amount by setting at least one of a charging amount for each date or for each time slot, control of the vehicle state, control of air conditioning setting, and whether a destination is set with respect to a location of the charging station.

Further, the setting unit may be configured to set the optimum charging time slot and charging amount by varying or combining charging amount and time slot for reserved charging for each date or for each time slot. The setting unit may be configured to set an accelerating and decelerating pattern based on setting of the optimum charging amount or a driver style. The setting unit may also be configured to set a charging amount or time by combining a set value for reserved charging of the power module, route information or a destination, the vehicle state, and the infrastructure information.

The measurement unit may be configured to measure a type of power module and a deterioration state of the power module with respect to a plug-in hybrid engine or an electric vehicle-dedicated engine to measure state information of the electric vehicle. The measurement unit may also be configured to measure an optimum charging time set by the setting unit or a charging amount acquired from the power module, measure a recharging range of the power module buffered, and measure charging finish time information of the power module.

The storage unit may be configured to store at least one of state information of the electric vehicle, battery information and driving style information acquired from the setting unit or the measurement unit. The storage unit may be configured to generate and store a profile for predicting charging of the power module from at least one of a charging amount, control of a vehicle state, control of air conditioning setting, a destination based on a location of a charging station and infrastructure information setting set by the setting unit.

In another aspect of the present invention, a method of charging an electric vehicle may include measuring a type of a power module and a deterioration state with respect to a plug-in hybrid engine or an electric vehicle engine to measure state information of the electric vehicle, setting a charging amount of the power module, determining whether the power module is consumed by measuring an accelerating and decelerating pattern based on a style of a driver, setting an optimum charging time slot and charging amount based on a charging amount for each time slot, control of a vehicle state, control of air conditioning setting, and setting of a destination based on a location of a charging station, correcting a charging time slot or a charging amount by calculating a charging amount and air conditioning consumption necessary to drive the electric vehicle, and providing information regarding an optimum charging time adjusted in response to an input charging time or a charging time based on consumption of the power module.

The setting of the charging amount may include setting an optimum charging amount by transmitting a battery capacity or state of the power module in real time to a head unit to monitor the battery capacity or battery state. Additionally, the setting of the optimum charging time slot and charging amount may include computing a charging rate when the charging amount of the power module is buffered by detecting a possible mileage of the power module. The setting of the optimum charging time slot and charging amount may further include setting a time slot available for charging at a lowest rate by monitoring electric rates of the charging station for each region or for each time slot.

Further, the setting of the optimum charging time slot and charging amount may include inputting information regarding a vehicle state or a vehicle route or infrastructure information to set charging information of the electric vehicle. The setting of the optimum charging time slot and charging amount may include setting a charging amount or a charging time by combining a set value for reserved charging of the power module, information regarding a route, a destination or a vehicle state and infrastructure information.

The correcting of the charging time slot or charging amount may include adjusting a reserved charging time slot and a charging amount set in advance by calculating a possible mileage and air conditioning consumption with respect to a battery amount of the power module based on reserved charging for each region or for each time slot set in advance in the setting of the optimum charging time slot and charging amount. The providing of the optimum charging may include transmitting information regarding an optimum charging time and a subsequent reserved charging time or charging amount input to a head unit or a mobile terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
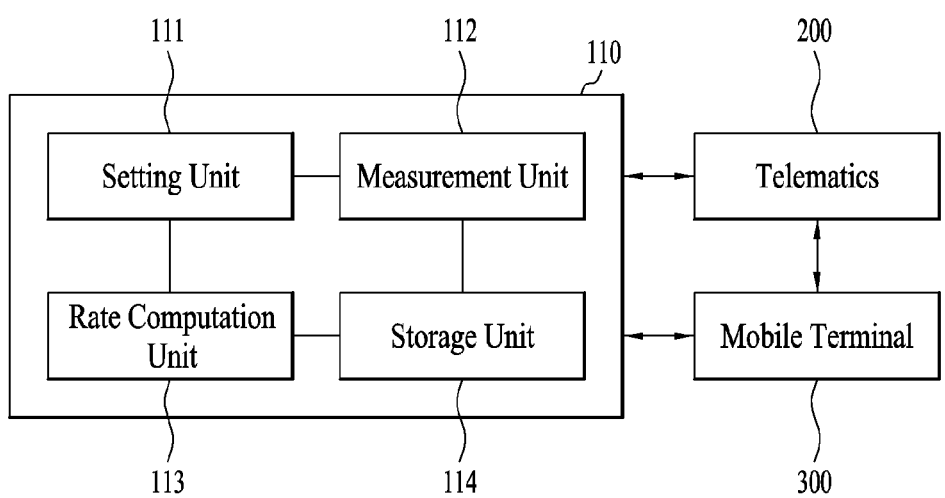
FIG. 1 is a block diagram illustrating a configuration of a system for charging an electric vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts. When a detailed description of known technology related to description of exemplary embodiments disclosed in this specification is determined to obscure the essence of the embodiments disclosed in this specification, the detailed description will be omitted. In addition, a certain portion illustrated in the drawings is minimized or simplified for convenience of description, and the drawings and components thereof are not necessarily illustrated at true scales. However, those skilled in the art may easily understand these matters.

Figure 2:
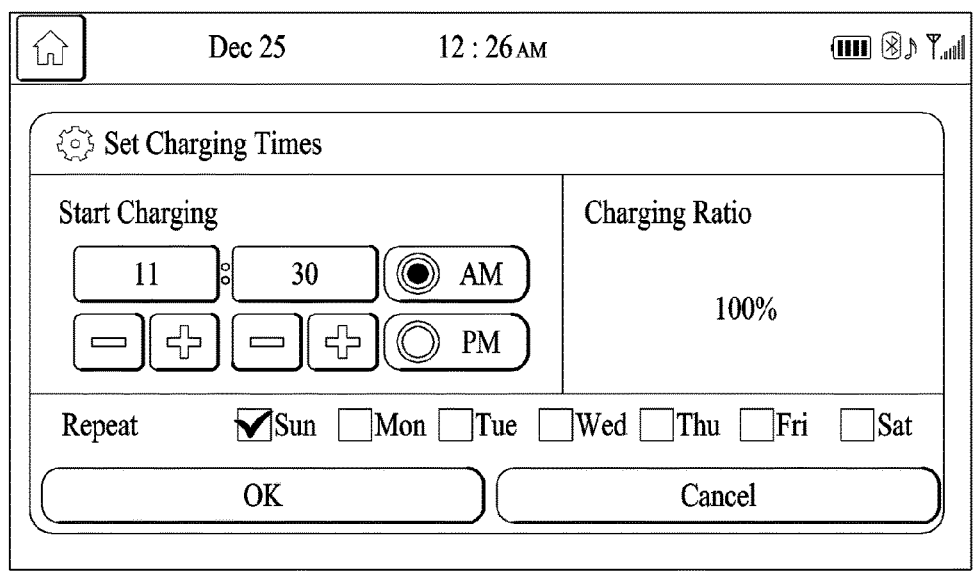
FIG. 2 is a diagram illustrating a head unit of the electric vehicle charging system according to an exemplary embodiment of the present invention.
Figure 3:
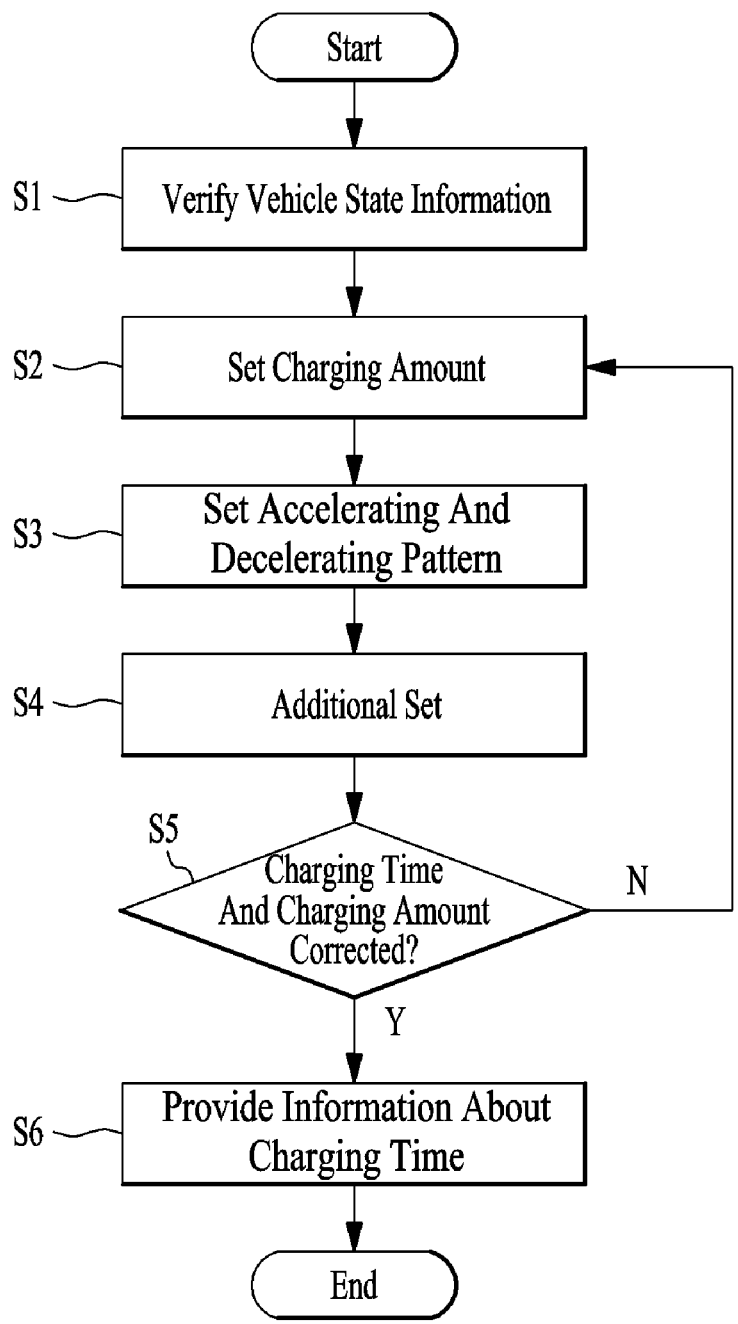
FIG. 3 is a flowchart illustrating the electric vehicle charging system and a method thereof according to an exemplary embodiment of the present invention.

FIG. 1 illustrates a configuration of a system for charging an electric vehicle according to an exemplary embodiment of the present invention, FIG. 2 illustrates a head unit of the electric vehicle charging system according to an exemplary embodiment of the present invention, and FIG. 3 illustrates the electric vehicle charging system and a method thereof according to an exemplary embodiment of the present invention. As illustrated in FIGS. 1 and 2, the electric vehicle charging system, denoted by reference numeral 100, may include a head unit 110, a telematics center 200, and a mobile terminal 300. Although the telematics center 200 and the mobile terminal 300 are included as components to describe the present invention, the present invention is not limited to the components. Further, the electric vehicle used in this specification refers to all means of transportation operable by electricity such as an electric bicycle in addition to a car.

The head unit 110 according to the present invention may be configured to operate point of interest (POI) information, an audio video navigation (AVN) device, or an electronic device in the vehicle, and may be configured to receive battery information of a power module mounted within the electric vehicle and display the information to a driver. Therefore, the head unit 110 may be configured to acquire POI information of a battery charging station or variable reserved battery charging based on a charge amount obtained from the power module, and thus acquire a location of the battery charging station located near (e.g., within a proximity or range of) a current location, near a destination, or nearby during driving. In particular, the head unit 110 and any components thereof may be executed by a controller.

Further, the head unit 110 may be configured to acquire at least one selected from the group consisting of a residual display of a current charging amount, a charging amount for each time slot, information regarding whether air conditioning is set, a vehicle state, etc. to reserve charging of the electric vehicle, and transmit the acquired information to the telematics center 200 or the mobile terminal 300. Accordingly, the driver may be capable of receiving and viewing a result of adjusting time in response to an optimum charging time set with respect to reserved charging of the power module included in the electric vehicle or regarding about recharging time in response to power consumption of the power module.

Moreover, the head unit 110 may include a setting unit 111, a measurement unit 112, a rate computation unit 113, and a storage unit 114. The setting unit 111 may be configured to set an operation time of the power module of the electric vehicle with respect to a charging time slot and a basic charging amount preset by the driver. Therefore, the setting unit 111 may be configured to selectively vary a charging amount based on an optimum charging time slot using a charging amount for each time slot (e.g., each charging time slot), a vehicle state, information regarding whether air conditioning is set, information regarding whether a destination is set during driving, etc. with respect to reserved charging set by the driver.

When a reserved charging time slot and a variable or combined charging amount are set, the setting unit 111 may be configured to compute and automatically calculate a battery efficiency of the power module or an electric rate provided from the rate computation unit 113 based on an optimum charging time or variable reserved charging, set an optimum charging time or charging amount in a currently set charging time slot, and set a subsequent charging range, thereby providing the driver with an optimum charging time or a variable reserved charging time.

The measurement unit 112 may be configured to measure electric quantities such as a voltage and a current or a temperature of the power module to measure a chemical property of the power module, thereby maintaining a battery, and may also be configured to predict a charging capacity, a lifespan, etc. of the power module to display the predicted charging capacity, lifespan, etc. on the head unit 110 (e.g. on a display visible to the driver). In addition, the measurement unit 112 may be configured to convert an alternating current (AC) commercial power source into a direct current (DC) power source for charging the power module, and usage of the commercial power source supplied to the power module may be measured by the measurement unit 112. Further, charging and discharging may be measured by detecting magnitudes of a voltage, a current, etc. of the DC power source supplied to the power module.

Therefore, the measurement unit 112 may be configured to receive a signal for determining whether to vary or combine the charging amount and the reserved charging time slot set by the setting unit 111, and store efficiency of the power module or a previously stored charging amount in the storage unit 114.

Subsequently, the measurement unit 112 may be configured to measure a battery deterioration state of the power module, an electric vehicle-dedicated engine, or a plug-in hybrid engine of the electric vehicle, monitor a capacity or a state of the battery of the power module in real time to provide an optimum charging time set by the setting unit 111, measure battery consumption of the power module by determining an accelerating and decelerating pattern for a driving style based on a driving habit of the driver, and adjust the charging time slot and the charging amount set by the setting unit 111 by calculating a charging amount and air conditioning consumption necessary for driving based on a residual quantity of the battery of the power module of the vehicle.

Furthermore, the rate computation unit 113 may be configured to monitor electric rates in real time based on POI information of a charging station acquired during driving (e.g., while the vehicle is being driven), a destination, a current location, or the reserved charging time slot set by the setting unit 111, to obtain a charging station and a time slot enabling charging at a minimum electric rate. For example, when a current power rate is relatively inexpensive as in discounted hours of late-night charging (e.g., rates decrease based on time of day or other reduced rate time slots), the battery of the power module may be charged at a relatively low cost. When power consumption is substantially high or a power rate is relatively expensive as in peak hours of power consumption (e.g., rates increase during peak hours or what would be considered busy hours), an inexpensive charging station may be scanned from the POI information. Accordingly, the power module may be charged at a reduced cost.

The storage unit 114 may be configured to store POI information related to a charging amount of the power module, a vehicle state, information regarding whether air conditioning is set, information regarding whether a destination is set during driving and a charging station provided from the setting unit 111, the measurement unit 112, and the rate computation unit 113.

Herein below, a description will be given of a system and method for charging an electric vehicle for implementing the present invention according to the electric vehicle charging system 100 having the above-described configuration. As illustrated in FIG. 3, the electric vehicle charging system 100 may include the head unit 110 configured to operate the electronic device of the electric vehicle, and the telematics center 200 configured to transmit a signal of a result of setting or operating the electric vehicle from the head unit 110 to the mobile terminal 300.

The method as described herein below may be executed by a controller. In particular the method may include a vehicle state information verification step S1 of measuring a type of the power module and a deterioration state with respect to the plug-in hybrid engine or the electric vehicle-dedicated engine to measure state information of the electric vehicle, a charging amount setting step S2 of setting a charging amount of the power module, an accelerating and decelerating pattern setting step S3 of setting an accelerating and decelerating pattern based on a driving style of the driver to determine whether the power module is consumed, an additional setting step S4 of setting an optimum charging time slot and charging amount based on a charging amount for each time slot, control of a vehicle state, control of air conditioning setting, and setting of a destination based on a location of a charging station, a correction step S5 of adjusting a charging time slot or a charging amount by calculating a charging amount and air conditioning consumption necessary to drive the electric vehicle, and a charging time information provision step S6 of providing information regarding an optimum charging time adjusted in response to an input charging time or a charging time based on consumption of the power module.

In addition, a battery deterioration state of the plug-in hybrid engine, the electric vehicle-dedicated engine or the power module of the electric vehicle may be measured, a battery capacity or state of the power module may be monitored in real time to provide an optimum charging time, a battery consumption of the power module may be measured by determining an accelerating and decelerating pattern of a driving style based on driving habits of the driver, and information regarding a vehicle state may be acquired to select a charging time slot and a charging amount by calculating a charging amount and air conditioning consumption necessary for driving based on a residual quantity of the battery of the power module of the vehicle.

Further, an operation time of the power module of the electric vehicle may be set with respect to a charging time slot and a basic preset charging amount, and an optimum charging amount may be set by transmitting the battery capacity or state of the power module in real time from the measurement unit 112 to the head unit 110 to monitor the battery capacity or battery state. In addition, a possible mileage of the power module may be measured, and a charging rate may be computed when the charging amount of the power module is buffered. In the additional setting process, a time slot available for charging at a lowest rate may be set by monitoring electric rates of the charging station for each region or for each time slot by the head unit 110.

Subsequently, information regarding a vehicle state or a vehicle route or infrastructure information may be input from the setting unit 111 to set charging information of the electric vehicle, and a charging amount or a charging time may be set by combining a set value for reserved charging of the power module, information regarding a route, a destination or a vehicle state and infrastructure information. In the correction step S5, a reserved charging time slot and a charging amount set in advance may be adjusted by calculating a possible mileage and air conditioning consumption with respect to a battery amount of the power module based on reserved charging for each region or for each time slot set in advance.

In the charging time information provision step S6, information regarding an optimum charging time and a subsequent reserved charging time or charging amount input from the setting unit 111 may be displayed on the head unit 110, the information may be transmitted to the telematics center 200 through the head unit 110, and the information may be transmitted to the mobile terminal 300 to be viewable by the driver.

A system and method for charging an electric vehicle according to the present invention is effective in obtaining an optimum charging time and variable reserved charging by diagnosing an electricity rate and a vehicle state for each date and for each time slot with respect to a charging time or a charging ending time of the electric vehicle, and automatically setting a variable charging time or charging amount based on a route to a destination during driving.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A system for charging an electric vehicle, comprising:
   a head unit configured to receive information regarding a battery of a power module mounted within the electric vehicle, and configured to display the information,
   wherein the head unit includes
   a setting unit configured to set variable reserved charging of the battery or a destination of a battery charging station based on a charging amount obtained from the power module,
   a measurement unit configured to acquire information regarding the power module or a residual quantity of the battery of the electric vehicle, and
   a storage unit including map data configured to store information regarding the electric vehicle or acquire a current location or a destination.

2. The system according to claim 1, further comprising:
   a telematics center configured to receive inputs of a charging amount for each time slot, information regarding whether an air conditioning is set, and a vehicle state to perform reserved charging of the electric vehicle, and is configured to transmit the inputs to a mobile terminal.

3. The system according to claim 2, wherein the telematics center is configured to transmit, to the mobile terminal, a result of adjusting time in response to an optimum charging time set with respect to reserved charging of the power module or information regarding recharging time in response to power consumption of the power module.

4. The system according to claim 1, wherein the head unit further includes:
   a rate computation unit configured to compute a charging rate of the electric vehicle based on a power transfer amount between the electric vehicle and the charging station and rate information for each time slot.

5. The system according to claim 4, wherein the rate computation unit is configured to calculate an electric rate with respect to battery usage efficiency or an amount of used power of the electric vehicle, and display the electric rate on the head unit.

6. The system according to claim 1, wherein the setting unit is configured to set an operation for a set charging time or charging amount of the electric vehicle.

7. The system according to claim 6, wherein the setting unit is configured to set charging information of the electric vehicle by inputting information regarding a vehicle state or a vehicle route or infrastructure information.

8. The system according to claim 7, wherein the setting unit is configured to set an optimum charging time slot and charging amount by setting at least one selected from the group consisting of: a charging amount for each date or for each time slot, control of the vehicle state, control of air conditioning setting, and whether a destination is set with respect to a location of the charging station.

9. The system according to claim 8, wherein the setting unit is configured to set the optimum charging time slot and charging amount by varying or combining charging amount and time slot for reserved charging for each date or for each time slot.

10. The system according to claim 9, wherein the setting unit is configured to set an accelerating and decelerating pattern based on setting of the optimum charging amount or a driver style.

11. The system according to claim 10, wherein the setting unit is configured to set a charging amount or time by combining a set value for reserved charging of the power module, route information or a destination, the vehicle state, and the infrastructure information.

12. The system according to claim 1, wherein the measurement unit is configured to measure a power module type and a deterioration state of the power module with respect to a plug-in hybrid engine or an electric vehicle-dedicated engine to measure state information of the electric vehicle.

13. The system according to claim 1, wherein the measurement unit is configured to measure an optimum charging time set by the setting unit or a charging amount acquired from the power module.

14. The system according to claim 13, wherein the measurement unit is configured to measure a recharging range of the power module buffered, and measure charging finish time information of the power module.

15. The system according to claim 1, wherein the storage unit is configured to store at least one from the group consisting of: state information of the electric vehicle, battery information, and acquired driving style information.

16. The system according to claim 15, wherein the storage unit is configured to generate and store a profile for predicting charging of the power module from at least one selected from the group consisting of: a charging amount, control of a vehicle state, control of air conditioning setting, a destination based on a location of a charging station, and infrastructure information setting set by the setting unit.

17. A method of charging an electric vehicle, comprising:
measuring, by a controller, a type of a power module and a deterioration state with respect to a plug-in hybrid engine or an electric vehicle engine to measure state information of the electric vehicle;
setting, by the controller, a charging amount of the power module;
determining, by the controller, whether the power module is consumed by measuring an accelerating and decelerating pattern based on a style of a driver;
setting, by the controller, an optimum charging time slot and charging amount based on a charging amount for each time slot, control of a vehicle state, control of air conditioning setting, and setting of a destination based on a location of a charging station;
adjusting, by the controller, a charging time slot or a charging amount by calculating a charging amount and air conditioning consumption necessary to drive the electric vehicle; and
providing, by the controller, information regarding an optimum charging time adjusted in response to an input charging time or a charging time based on consumption of the power module.

18. The method according to claim 17, wherein the setting of the charging amount includes setting, by the controller, an optimum charging amount by transmitting a battery capacity or state of the power module in real time to a head unit to monitor the battery capacity or battery state.

19. The method according to claim 17, wherein the setting of the optimum charging time slot and charging amount includes computing, by the controller, a charging rate when the charging amount of the power module is buffered by detecting a possible mileage of the power module.

20. The method according to claim 19, wherein the setting of the optimum charging time slot and charging amount includes setting, by the controller, a time slot available for charging at a lowest rate by monitoring electric rates of the charging station for each region or for each time slot.

21. The method according to claim 20, wherein the setting of the optimum charging time slot and charging amount includes inputting, by the controller, information regarding a vehicle state or a vehicle route or infrastructure information to set charging information of the electric vehicle.

22. The method according to claim 21, wherein the setting of the optimum charging time slot and charging amount includes setting, by the controller, a charging amount or a charging time by combining a set value for reserved charging of the power module, information regarding a route, a destination or a vehicle state, and infrastructure information.

23. The method according to claim 17, wherein the adjusting includes adjusting, by the controller, a reserved charging time slot and a charging amount set in advance by calculating a possible mileage and air conditioning consumption with respect to a battery amount of the power module based on reserved charging for each region or for each time slot set in advance in the setting of the optimum charging time slot and charging amount.

24. The method according to claim 17, wherein the providing of information includes transmitting, by the controller, information regarding an optimum charging time and a subsequent reserved charging time or input charging amount to a head unit or a mobile terminal.

* * * * *